United States Patent [19]

Sekizaki

[11] Patent Number: 4,879,919

[45] Date of Patent: Nov. 14, 1989

[54] TRANSMISSION EQUIPPED WITH REVERSE MECHANISM

[75] Inventor: Satoshi Sekizaki, Tokyo, Japan

[73] Assignee: Honda Giken Kogyo Kabushiki Kaisha, Tokyo, Japan

[21] Appl. No.: 82,515

[22] Filed: Aug. 7, 1987

[30] Foreign Application Priority Data

Aug. 8, 1986 [JP] Japan .................... 61-121011[U]

[51] Int. Cl.$^4$ .............................................. F16H 5/06
[52] U.S. Cl. ...................................... 74/337.5; 74/474
[58] Field of Search ....................... 74/337.5, 476, 475

[56] References Cited

U.S. PATENT DOCUMENTS

| 4,510,820 | 4/1985 | Tsuboi | 74/474 |
| 4,574,652 | 3/1986 | Shichinohe | 74/474 |
| 4,713,979 | 12/1987 | Muto et al. | 74/337.5 |

FOREIGN PATENT DOCUMENTS

| 2826040 | 12/1979 | Fed. Rep. of Germany | 74/475 |
| 54-145854 | 11/1979 | Japan | 74/337.5 |
| 55-126149 | 9/1980 | Japan | 74/337.5 |
| 59-86734 | 5/1984 | Japan | 74/337.5 |

Primary Examiner—Leslie A. Braun
Assistant Examiner—Scott Anchell
Attorney, Agent, or Firm—Birch, Stewart, Kolasch & Birch

[57] ABSTRACT

A transmission having a reverse mechanism for use in an automotive vehicle which includes a forward shift drum both ends of which are rotatably supported by an engine case, and a reverse shift drum concentrically arranged with the forward shift drum and relatively rotatably fitted to the peripheral surface of the forward shift drum. This transmission comprises a first rotation positioning mechanism provided on one end portion of the foward shift drum and adapted to regulate a rotary position of the drum, and a second rotation positioning mechanism provided on the reverse shift drum at an end portion thereof opposite to the one end portion and adapted to regulate a rotary position of the reverse shift drum. These first and second rotation positioning mechanisms are disposed at the outer side of the engine case respectively.

5 Claims, 4 Drawing Sheets

TRANSMISSION EQUIPPED WITH REVERSE MECHANISM

BACKGROUND OF THE INVENTION

This invention relates to a transmission for use in an automotive vehicle, and more particularly to a transmission equipped with a reverse mechanism.

In a conventional transmission equipped with a reverse mechanism for use in a three-wheeled or four-wheeled buggy car, etc., a forward shift drum rotated by a first operating element and a reverse shift drum rotated by a second operating element are separately supported within the transmission. Upon rotation of each of these forward and reverse shift drums, shift forks engaged in lead grooves in the outer peripheral surface of the drums shift, so that forward and reverse gears are brought into driving engagement with a drive shaft by means of shifters integrally mounted to the shift forks.

However, a transmission having a forward and a reverse shift drums separately supported therein is increased in size. In view of the foregoing, the present assignee has proposed in its U.S. patent application Ser. No. 946,359 filed on Dec. 14, 1986, now U.S. Pat. No. 4,713,979 that the forward shift drum and the reverse shift drum are concentrically overlapped with each other in order to reduce the size of the transmission.

However, each of the shift drums is required to be provided with a rotation positioning mechanism in order to regulate the rotary position for moving a predetermined shift fork. Accordingly, in the case the forward and the backward shift drums are overlapped, it becomes a problem how and where to provide these rotation positioning mechanisms to the respective shift drums. Furthermore, it is desirable that these rotation positioning mechanisms are provided in such a fashion as to facilitate a maintenance.

SUMMARY OF THE INVENTION

The present invention is directed to an improvement of a transmission equipped with a reverse mechanism comprising a forward shift drum rotatably supported at both ends thereof by an engine case, and a reverse shift drum concentrically arranged with the forward shift drum and relatively rotatably fitted on the peripheral surface of the forward shift drum. The transmission equipped with a reverse mechanism according to the present invention includes a rotation positioning mechanism mounted on one end portion of the forward shift drum for regulating a rotary position of the drum, and a rotation positioning mechanism mounted on the reverse shift drum at an end portion thereof opposite to said one end portion for regulating a rotary position of the reverse shift drum. These rotation positioning mechanism are provided at the outer side of the engine case, respectively.

According to the present invention, the rotation positioning mechanisms of the respective shift drums are mounted on the opposite ends so as not to interfere with each other, and these rotation positioning mechanisms are provided at the outer side of the engine case. Accordingly, upon maintenance, the engine case is not required to be separated apart and opened. Instead, it is sufficient that a cover is simply removed. Accordingly, the maintaining performance is enhanced.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
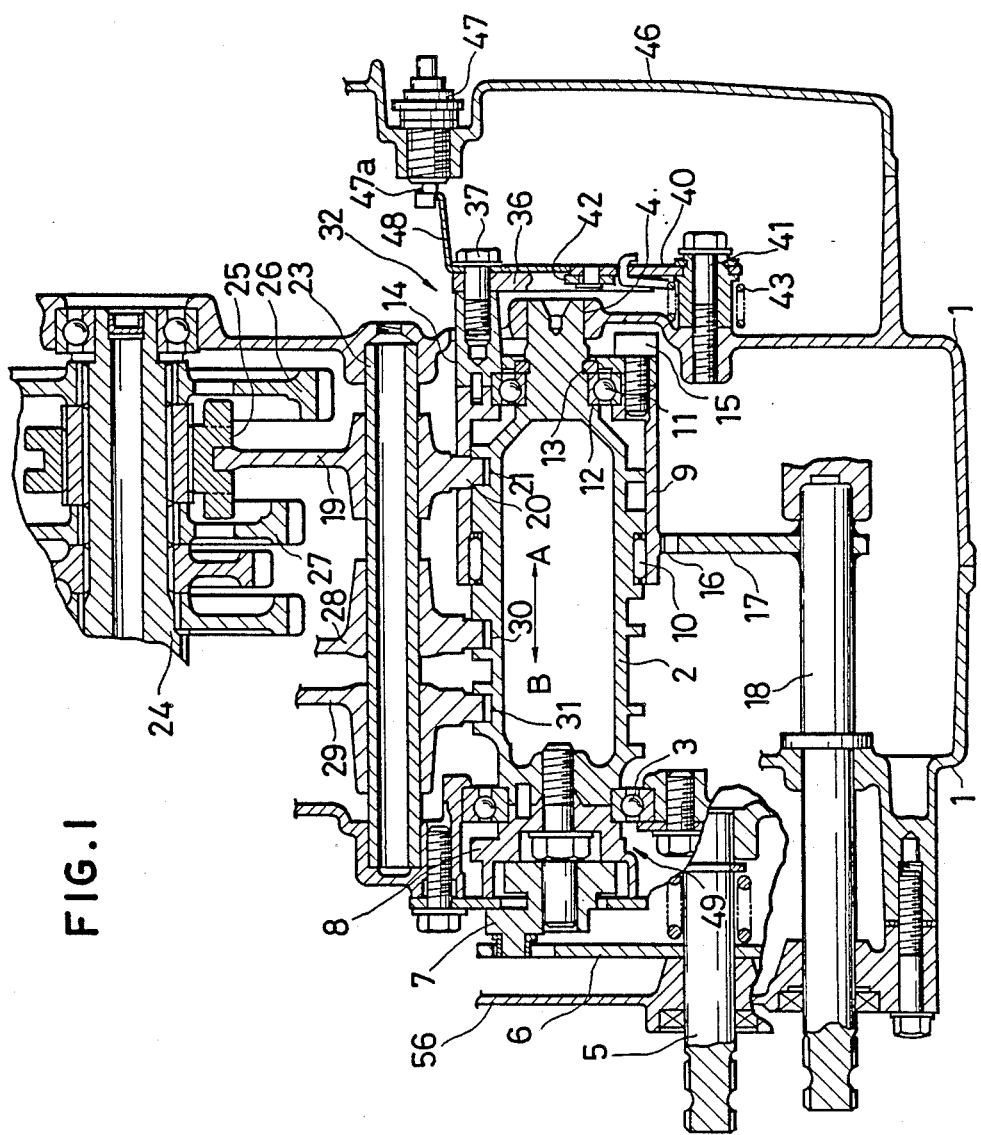
FIG. 1 is a sectional view of an important portion of a transmission according to the present invention.

The present invention will be described with reference to the illustrated embodiments. FIG. 1 is a sectional view of an important portion of a transmission according to the present invention. A crank case 1 (engine case) is provied. A forward shift drum 2 is rotatably carried by bearings 3 and 4 which are mounted on both sides of the crank case 1. Upon rotation of a forward shift spindle 5 disposed parallel to the forward shift drum 2, the drum 2 is rotated by a lever 6 secured to the spindle 5 and a connecting member 7 secured to the forward shift drum 2 and engaged in an elongated hole formed in the lever 6 in the radial direction thereof. Between the connecting member 7 and the forward shift drum 2, a rotation positioning member 8 which constitutes a rotation positioning mechanism of the forward shift drum 2 as will be described hereinafter, is interposed. The connecting member 7 and the rotation positioning member 8 are secured to the forward shift drum 2. The rotation positioning member 8 is disposed at the outer side of the bearing 3, i.e., the outer side of the crank case 1.

At the right side of the forward shift drum 2, a reverse shift drum 9 is disposed coaxial with the drum 2. The reverse drum 9 is relatively rotatably fitted to the forward shift drum 2 with a ball bearing 11 and a needle bearing 10 interposed between the outer peripheral surface of the forward shift drum 2 and the inner peripheral surface of the reverse shift drum 9. The ball bearing 11 is prevented from moving in the axial direction by an inner race thereof being held between a step portion 12 provided on the forward shift drum 2 and a set ring 13 fitted in a groove formed in the forward shift drum 2. The position of the reverse shift drum 9 in the axial direction is established with respect to the forward shift drum 2 by an outer race of the ball bearing 11 fastened to the reverse shift drum 9 through a bearing holder 14 fixed to an end face of the reverse shift drum 9 by a bolt 15. An outer peripheral portion of the reverse shift drum 9 is formed with a sector gear portion 16 integrally. A sector gear 17 meshes with the gear portion 16. The sector gear 17 is secured to a reverse shift spindle 18 disposed in parallel with the reverse shift drum 9. Upon rotation of the reverse shift spindle 18 by a pedal (not shown, second operating element), the reverse shift drum 9 is rotated through the sector gear 17 and the gear portion 16.

The forward shift drum 2 and the reverse shift drum 9 are formed in their overlapping portions respectively with lead grooves 21 and 22 (see FIG. 2) crossing with each other, the grooves 21 and 22 being adapted to move a shift fork 19 in the axial direction (A—B direction) of the shift drums 2 and 9 by guiding a pin 20 which is integral with the shift fork 19. The lead groove 21 formed in the forward shift drum 2 has an upper end 21b of FIG. 2 inclined towards the right in the figure, whereas the lead groove 22 formed in the reverse shift drum 9 has an upper end 22b inclined in the opposite direction towards the left in the figure. The lead groove 22 of the reverse shift drum 9 reaches the inner surface of the drum 9 so that the pin 20 can be pierced therethrough. Furthermore, the lead grooves 21 and 22 are provided at portions where the pin 20 is present when in a neutral position, with relief grooves 21a and 22a projecting sidewards therefrom.

Figure 2:
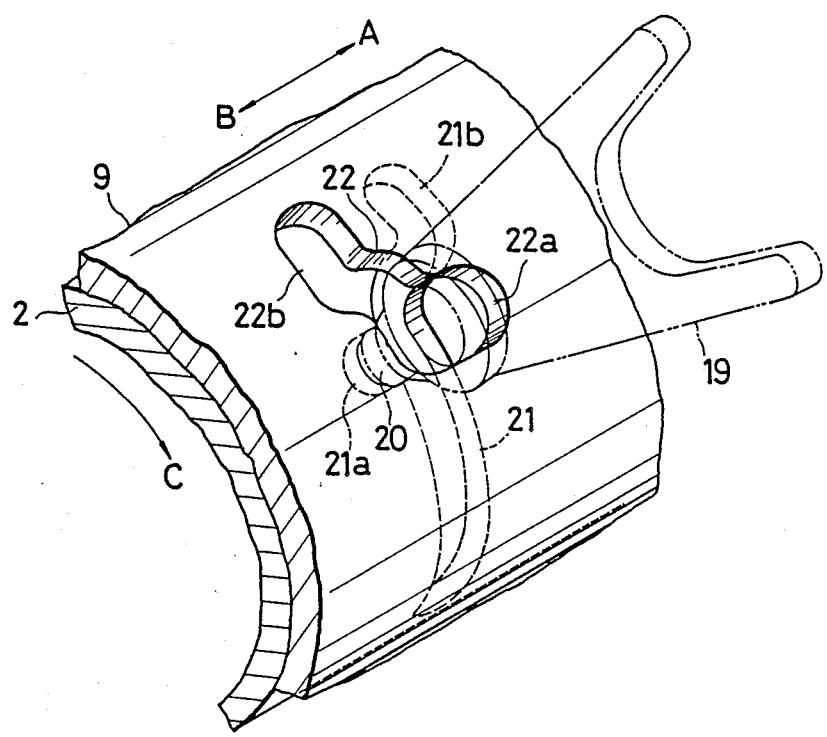
FIG. 2 is an enlarged perspective view of a shift drum portion.

The shift fork 19 is slidably supported by a shift fork supporting shaft 23 disposed in parallel with the shift drums 2 and 9 for sliding in the axial direction or A—B direction. The opposite end portion of the shift fork 19 to the pin 20 is engaged with a shifter 25 which is spline fitted to a drive shaft 24. The movement of the shift fork 19 in the A direction causes the shifter 25 to move in the A direction to be engaged with a low gear 26. The low gear 26 is loosely fitted to the drive shaft 24. When the low gear 26 is engaged with the shifter 25, the gear 26 is connected with the drive shaft 24 through the shifter 25 and is integrally rotated together with the drive shaft 24. Similarly, when the shift fork 19 is moved in the B direction, a back gear 27 is connected with the drive shaft 24 through the shifter 25. In FIG. 2, the relative positions of the shift drums 2 and 9 and the position of the pin 20 of the shift fork 19 when in the neutral position are illustrated. In order to shift the gear from the foregoing state to LOW, after the clutch has been brought to OFF-state, the forward shift spindle 5 is rotated to rotate only the forward shift drum 2 in the C direction of FIG. 2. Then, the pin 20 is guided to the inclined section 21b at the front end of the lead groove 21 and is moved in the A direction. As a result, the shifter 25 is brought to engagement with the low gear 26 and the power of the drive shaft 24 is transmitted to the drive wheel side through the low gear 26. At that time, even if the reverse shift drum 9 is attempted to rotate by operating the reverse operating element, the reverse shift drum 9 will not be rotated because the pin 20 is fitted to the relief section 22a of the lead groove 22 of the reverse shift drum 9 and a side wall of the relief section 22a functions as a detent or stopper. When reversing, the reverse shift spindle 18 is operated to rotate the reverse shift drum 9 in the C direction from the neutral position shown in FIG. 2. Then, the pin 20 is guided to the inclined section 22b at the front end of the lead groove 22 and is moved in the B direction. As a result, the shifter 25 is brought to engagement with a back gear 27 and the power of the drive shaft 24 is transmitted to the drive wheel side through the back gear 27 and an idle gear not illustrated. At that time, since the pin 20 is brought to be fitted to the relief section 21a of the lead groove 21, the section 21a functions as a detent or stopper and a forward operation cannot be performed through the forward shift drum 2. In order to perform a forward operation, the reverse shift drum 9 must be rotated in the opposite direction and returned to its neutral position.

The shift fork supporting shaft 23 also supports other shift forks 28 and 29. These shift forks 28 and 29, as known, are engaged with lead grooves 30 and 31 formed in the outer periphery of the forward shift drum 2, respectively. When the forward shift drum 2 is rotated in the opposite direction to the arrow C from the neutral position of FIG. 2, the shift forks 28 and 29 are separately moved in the A direction or B direction according to the rotary position and causes the respective second to fifth gears on the drive shaft 24 to be connected to the drive shaft 24 in turn in the manner as the afore-mentioned shift fork 19.

Figure 3:
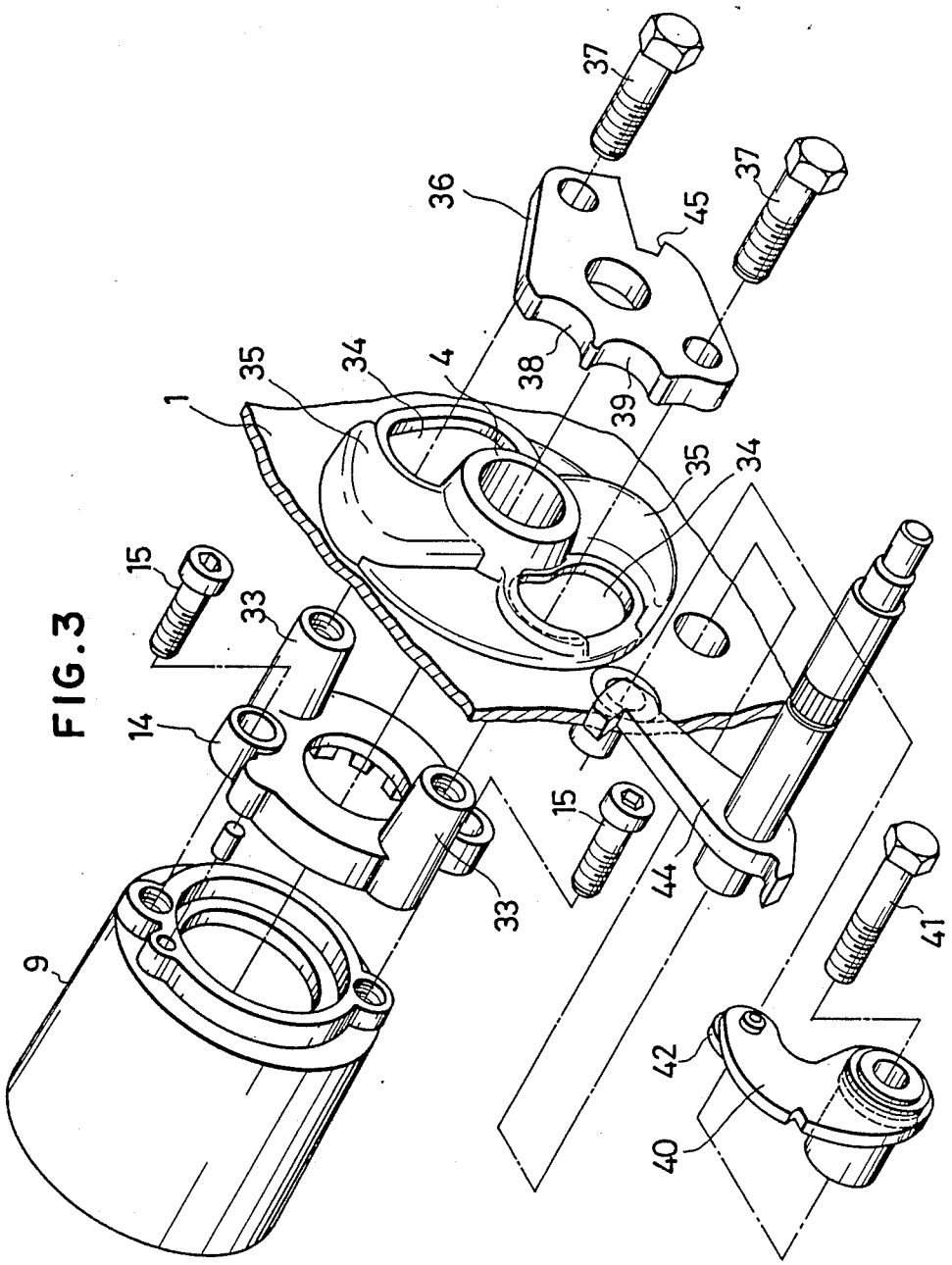
FIG. 3 is a fragmentary perspective view of a rotation positioning mechanism of a reverse shift drum.

The forward shift drum 2 and the reverse shift drum 9 are provided with a rotation positioning mechanism, respectively, in order to hold each of them in a rotary position corresponding to the neutral or desired shifting stage. A rotation positioning mechanism 32 of the reverse shift drum 9 will be described first with reference to Figs. 1, 3, and 4. The rotation positioning mechanism 32, as is shown in FIG. 1, is connected with the right end of the reverse shift drum 9 and is provided at the outer side of the crank case 1. The reverse shift drum 9 has the bearing holder 14 secured to a right end face thereof by the bolt 15 as described. The holder 14 has bosses 33, 33 projecting from an opposite end face thereof opposite to the shift drum 9 at positions generally opposite to each other on a diameter. The bearing 4 portion of the crank case 1 for carrying the forward shift drum 2, is formed therearound with arcuate through holes 34,34. The bosses 33 are projected outwards of the crank case 1 piercing through these through holes 34. Upon rotation of the reverse shift drum 9, the bosses 33 are moved along the through holes 34. A relief section 35 is expanded outwards, the inner side thereof being depressed. Since the head portion of the bolt 15 is rested in the depressed portion, the bolt 15 can be freely moved according to rotation of the reverse shift drum 9. A positioning member 36 is secured to end faces of the bosses 33 projecting outwards piercing through the through holes 34, by bolts 37. Accordingly, the positioning member 36 is integrally rotated together with the reverse shift drum 9 at the outer side of the crank case 1. As is apparent from the foregoing description, the bearing holder 14 functions as a connecting member for connecting the reverse shift drum 9 and the positioning member 36 together. The positioning member 36 is formed on the outer peripheral surface thereof at a position corresponding to the inclined section 22b at the tip end of the lead groove 22 of the reverse shift drum 9 with a reverse positioning portion 38 which is arcuately depressed, and at the neutral position corresponding to the relief section 22a of the lead groove 22 with a neutral positioning portion 39 which is likewise arcuately depressed. Adjacent to the positioning member 36, a positioning arm 40 is swingably attached to the crank case 1 by a pivot shaft 41. The positioning arm 40 has a roller 42 rotatably supported on the tip end thereof, the roller 42 being engagable with the reverse positioning portion 38 or the neutral positioning portion 39. The positioning arm 40 is energized by a spring 43 to urge the roller 42 against the positioning portions 38 and 39. Accordingly, the rotary position of the reverse shift drum 9 is regulated to a reverse position where the roller 42 is engaged with the reverse positioning portion 38, or a neutral position where the roller 42 is engaged with the neutral positioning portion 39, and is held in either one of the above-mentioned positions unless a turning force overcoming the spring 43 is incurred by the reverse shift spindle 18 and will not occupy an intermediate position. The crank case 1 has a reverse lock 44 swingably attached thereto.

Figure 4:
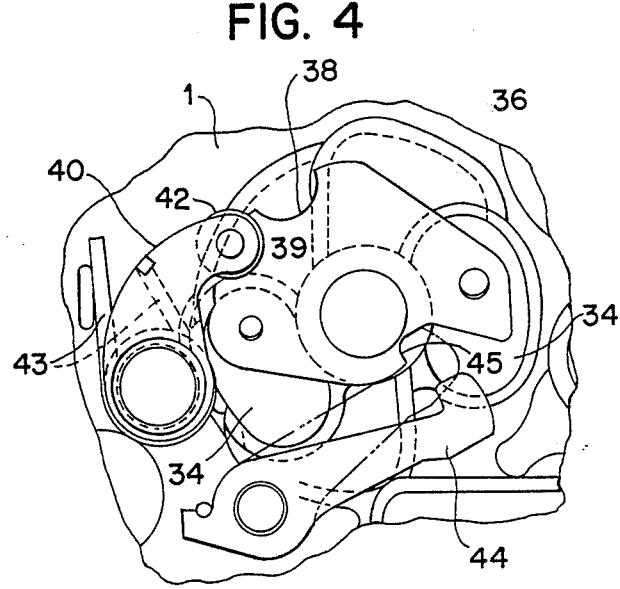
FIG. 4 is a front view of the rotation positioning mechanism of the reverse shift drum.

The reverse lock 44, when the reverse shift drum 9 is in the neutral position, is in engagement with a cut-out portion 45 of the positioning member 36 as shown by a chain line of FIG. 4 so as to lock the rotation of the reverse shift drum 9. The reverse lock 44 is linked to a lever on a steering wheel and is moved to a position shown by a solid line to unlock the reverse shift drum 9 when the lever is manipulated. Accordingly, when reversing, the lever on the steering wheel must be manipulated first to unlock the reverse shift drum 9. Therefore, even if the reverse shift spindle 18 should be unintendedly manipulated by mistake during the forwarding operation, the reverse shift drum 9 would not be rotated to the reverse position.

The above-mentioned positioning member 36, positioning arm 40, reverse lock 44, etc. are all disposed on the outer side of the crank case 1 and the exteriors thereof are covered with a cover 46 which is mounted on the crank case 1 (see FIG. 1). The cover 46 has a reverse indicator switch 47 attached thereto. A contacting piece 47a of the switch 47 is actuate by a reverse indicator rotor 48 secured to the positioning member 36 when the reverse shift drum 9 has moved to the reversing position, and the switch 47 is turned on. As a result, an indicating lamp, for example, on a panel in front of the driver is lighted up to indicate that a reversing operation is undergoing.

Figure 5:
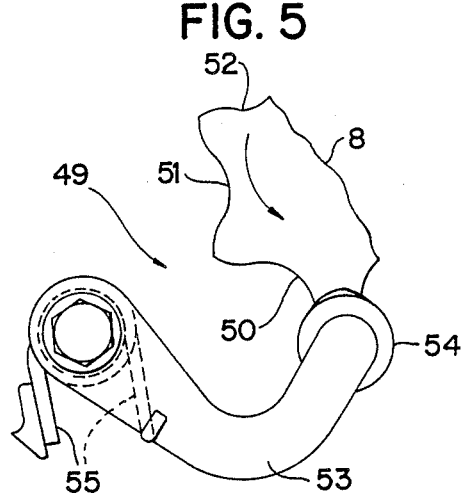
FIG. 5 is a front view of a part of a rotation positioning mechanism of a forward shift drum.

A rotation positioning mechanism 49 of the forwarding shift drum 2 comprises the aforementioned positioning member 8. The rotation positioning member 8 is formed on the peripheral surface with a neutral positioning portion 50, a second speed positioning portion 51, a third speed positioning portion 52, etc., similar to the positioning portions 38 and 39 of the positioning member 36 in turn as shown in FIG. 5, so that a roller 54 rotatably supported on the tip end of a positioning arm 53 which is pivotally attached to the crank case 1, may be engaged with these positioning portions 50, 51, 52, etc. The positioning arm 53 is energized counterclockwise in FIG. 5 by a spring 55. As the rotation positioning member 8 is rotated and moved in the arrowed direction from the illustrated position according to the rotation of the forward shift drum 2, the roller 54 is caused to engage with the positioning portions 50, 51, 52, etc. in turn so as to hold forward shift drum 2 in a rotary position corresponding to a desired shifting stage. The exterior of the rotation positioning mechanism 49 is covered with a cover 56 (FIG. 1).

In the present embodiment, the forward shift drum 2 and the reverse shift drum 9 provided at the respective opposite end portions with rotation positioning mechanisms 49 and 32, are coaxially fitted overlapping with each other. Accordingly, the transmission as a whole can be made compact. Moreover, the rotation positioning mechanisms 49 and 32 are all disposed at the outer side of the crank case 1. Accordingly, when these rotation positioning mechanisms and the reverse lock 44, the reverse switch 47, etc. attached to the mechanisms are to be maintained, the cover 46 or the cover 56 may be simply removed, and the crank case 1 is not required to be disassembled to open the interior thereof. Accordingly, the maintaining work is extremely easy.

Furthermore, in the present embodiment, the reverse shift drum 9 is fitted to the peripheral surface of the forward shift drum 2 by the needle bearing 10 and the ball bearing 11, and the positioning of the reverse shift drum 9 in the axial direction is performed by holding the outer race of the ball bearing 11 between the reverse shift drum 9 and the bearing holder 14, and no portion is present between the forward shift drum 2 and the reverse shift drum 9, where a friction resistance is produced by face contact. Accordingly, both of them can perform a smooth rotary motion independently.

What is claimed is:

1. A transmission having a reverse mechanism including a forward shift drum both ends of which are rotatably supported by an engine case, and a reverse shift drum concentrically arranged with said forward shift drum and relatively rotatably fitted to the peripheral surface of said forward shift drum, said transmission comprising
   a first rotation positioning mechanism provided on one end portion of said forward shift drum for regulating a rotary position of said forward shift drum; and
   a second rotation positioning mechanism provided on said reverse shift drum at an end portion thereof opposite to said one end portion for regulating a rotary position of said reverse shift drum;
   said first and second rotation positioning mechanisms being disposed at an outer side of said engine case, respectively.

2. The transmission as claimed in claim 1, wherein an exterior of said rotation positioning mechanisms is covered with a cover respectively.

3. The transmission as claimed in claim 1, wherein said rotation positioning mechanism of said reverse shift drum comprises
   a connecting member secured to an end portion of said reverse shift drum and having a boss projecting outwards of said engine case piercing through an arcuate through hole formed in the engine case;
   a positioning member secured to an external end of said boss and provided on peripheral surface thereof with a depressed reverse positioning portion and a depressed neutral positioning portion; and
   a positioning arm swingably mounted on said engine case and selectively engaged with said reverse positioning portion and said neutral positioning portion.

4. The transmission as claimed in claim 3, wherein said rotation positioning mechanism of said reverse shift drum includes a reverse lock adapted to lock said positioning member when said reverse shift drum is in the neutral position.

5. The transmission as claimed in claim 3, wherein said reverse shift drum and said connecting member have an outer race of a ball bearing held therebetween, and an inner race of said ball bearing is secured to said forward shift drum.

* * * * *